(12) United States Patent
Lavanya et al.

(10) Patent No.: US 7,885,994 B2
(45) Date of Patent: Feb. 8, 2011

(54) FACILITATING A USER OF A CLIENT SYSTEM TO CONTINUE WITH SUBMISSION OF ADDITIONAL REQUESTS WHEN AN APPLICATION FRAMEWORK PROCESSES PRIOR REQUESTS

(75) Inventors: Veerubhotla V Lavanya, Vijayawada Krishna District (IN); Subramanian C Venkataraman, Hyderabad (IN); Rajesh Kumar Choudhary, Nagour (IN); Dharanidhar Lanka, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 344 days.

(21) Appl. No.: 12/035,451

(22) Filed: Feb. 22, 2008

(65) Prior Publication Data
US 2009/0172084 A1   Jul. 2, 2009

(30) Foreign Application Priority Data
Jan. 2, 2008   (IN) .................... 17/CHE/2008

(51) Int. Cl.
*G06F 15/16* (2006.01)
(52) U.S. Cl. ..................... 709/201
(58) Field of Classification Search ............. 709/201, 709/203
See application file for complete search history.

(56) References Cited

U.S. PATENT DOCUMENTS

| | | | |
|---|---|---|---|
| 2003/0065701 A1* | 4/2003 | Uner | 709/102 |
| 2006/0122976 A1* | 6/2006 | Baluja et al. | 707/3 |
| 2007/0011302 A1* | 1/2007 | Groner et al. | 709/224 |
| 2007/0100962 A1* | 5/2007 | Barth et al. | 709/217 |
| 2008/0133811 A1* | 6/2008 | Lu et al. | 710/244 |

OTHER PUBLICATIONS

"UNIX Tutorial Five", Date Oct. 9, 2000; pp. 1-6.

* cited by examiner

*Primary Examiner*—Wing F Chan
*Assistant Examiner*—Andrew Woo
(74) *Attorney, Agent, or Firm*—Narendra Reddy Thappeta

(57) ABSTRACT

A computing system in which a user of a client system can continue with submission of an additional request while an application framework processes prior requests. In an embodiment, when a request is received, the resource requirements for processing the request are determined. If the resource requirements exceed a threshold, the request may be processed in the background. The user can continue issuing additional requests. After completion of processing of a request, the availability of the results may be notified in a pre-specified portion of a window from which the user is interacting with the application framework. The user may conveniently request the results by clicking on a portion of the displayed message.

19 Claims, 13 Drawing Sheets

| ROW-identifier | TICKER_ID | TICKER_NAME | TICKER_DISPLAY_MODE |
|---|---|---|---|
| 11001 | T1 | Ticker_one | Horizontal |
| 11002 | T2 | Ticker_two | Vertical |

*FIG. 11A*

| ROW-Identifier | Request_Type | FLAG_TICKER_ENABLED | TICKER_IDENTIFIER |
|---|---|---|---|
| 11001 | Submit Payroll | Y | T1 |
| 11002 | PO_generation | Y | T1 |
| 11001 | INVOICING | N | |
| 11002 | Revenue_Generation | Y | T2 |

*FIG. 11B*

| Row Identifier | Request_ID | TICKER_ID | Request_STATUS | DISPLAY_MSG | Time_ENTERED | Results-Location |
|---|---|---|---|---|---|---|
| 11201 | P4 | T2 | Executing | Executing revenue generation Q2 | 01-Oct-2007 | |
| 11202 | 111000 | T1 | Completed | Payroll request id 111000 has been completed | 30-Sep-2007 | Location 2 |
| 11203 | P4 | T2 | Completed | Completed revenue generation request Oct 1 2007 | 01-Oct-2007 | Location 3 |

*FIG. 11C*

FACILITATING A USER OF A CLIENT SYSTEM TO CONTINUE WITH SUBMISSION OF ADDITIONAL REQUESTS WHEN AN APPLICATION FRAMEWORK PROCESSES PRIOR REQUESTS

RELATED APPLICATION

The present application is related to and claims priority from the co-pending India Patent Application entitled, "FACILITATING A USER OF A CLIENT SYSTEM TO CONTINUE WITH SUBMISSION OF ADDITIONAL REQUESTS WHEN AN APPLICATION FRAMEWORK PROCESSES PRIOR REQUESTS", Serial Number: 17/CHE/2008, attorney docket number: ORCL-076/India, Filed: Jan. 2, 2008, Applicant: Oracle International Corporation, naming the same inventors V V Lavanya, Subramanian C Venkataraman, Rajesh Kumar Choudhary and Dharanidhar Lanka as in the subject patent application, and is incorporated in its entirety herewith

BACKGROUND

1. Technical Field

The present disclosure relates to web based applications and more specifically to facilitating a user to continue with submission of additional requests when an application framework processes prior requests requiring substantial time.

2. Related Art

An application contains software instructions, which on execution perform one or more functions. For example, an order processing application contains instructions to perform functions such as booking of orders, verification of stock availability., etc. In general, several distinct applications execute on a shared run time environment (consisting of operating system, device drivers, etc.), as is well known in the relevant arts.

Application framework refers to one or more applications, which together provide a common interface to a user. Users may use the common interface to interact with potentially all applications provided by the framework. For example, an application framework may contain different applications for respective higher level human resources, pay roll, accounting, sales, etc., with the applications being accessible through a common interface and also sharing the data as appropriate.

Users generally send requests using an interface provided by an application framework. Each request specifies an action to be performed (such as to provide specific information or to update data), and one or more applications of the framework may execute the corresponding instructions to perform the requested action.

In general, processing of requests may require various processing resources which are generally determined by various factors such as complexity of the requested action, and/or the amount of data to be processed, etc. Accordingly, the application framework may take certain time to provide a response to the requests.

Thus, in a prior approach, users requiring to process any additional requests within the interface provided by the application framework, may need to wait until the processing of a prior request is completed. Thus, if a prior request requires substantial processing time, the user may need to wait for a correspondingly longer duration of time.

Hence, there is a need to provide a method of facilitating a user to continue with submission of additional requests when an application framework processes prior requests requiring substantial time.

BRIEF DESCRIPTION OF THE DRAWINGS

Example embodiments of the present invention will be described with reference to the accompanying drawings briefly described below.

FIGS. 11A, 11B and 11C depicts various tables (and corresponding information for requests which are determined to be processed in background) in an embodiment of the present invention.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention facilitates a user to continue with submission of additional requests when an application framework processes prior requests. In an embodiment, a client system interfacing with a server cluster executing an application framework submits a request and receives an indication indicating that the request is being processed in the background. The user may submit additional requests from the same user interface provided by the application framework, while the previously submitted request is being processed in the background.

On completion of execution of the request (by the server cluster), the client system may receive a notification indicating the availability of the corresponding result. The user may then access the result of the request processed in the background. As may be appreciated, the user may have sent many requests in sequence between submission of the request (executed in background) and viewing of the corresponding results.

According to another aspect of the present invention, the user interface is provided based on a window displayed on a display screen and a pre-specified portion of the window is allocated for notification of the status of the requests processed in background. The notification of availability of the result may be provided in the pre-specified portion of the window from which the request was previously issued. The notifications corresponding to the requests processed in the background mode may be gradually scrolled in such a portion, and accordingly the display may be referred to as a ticker.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
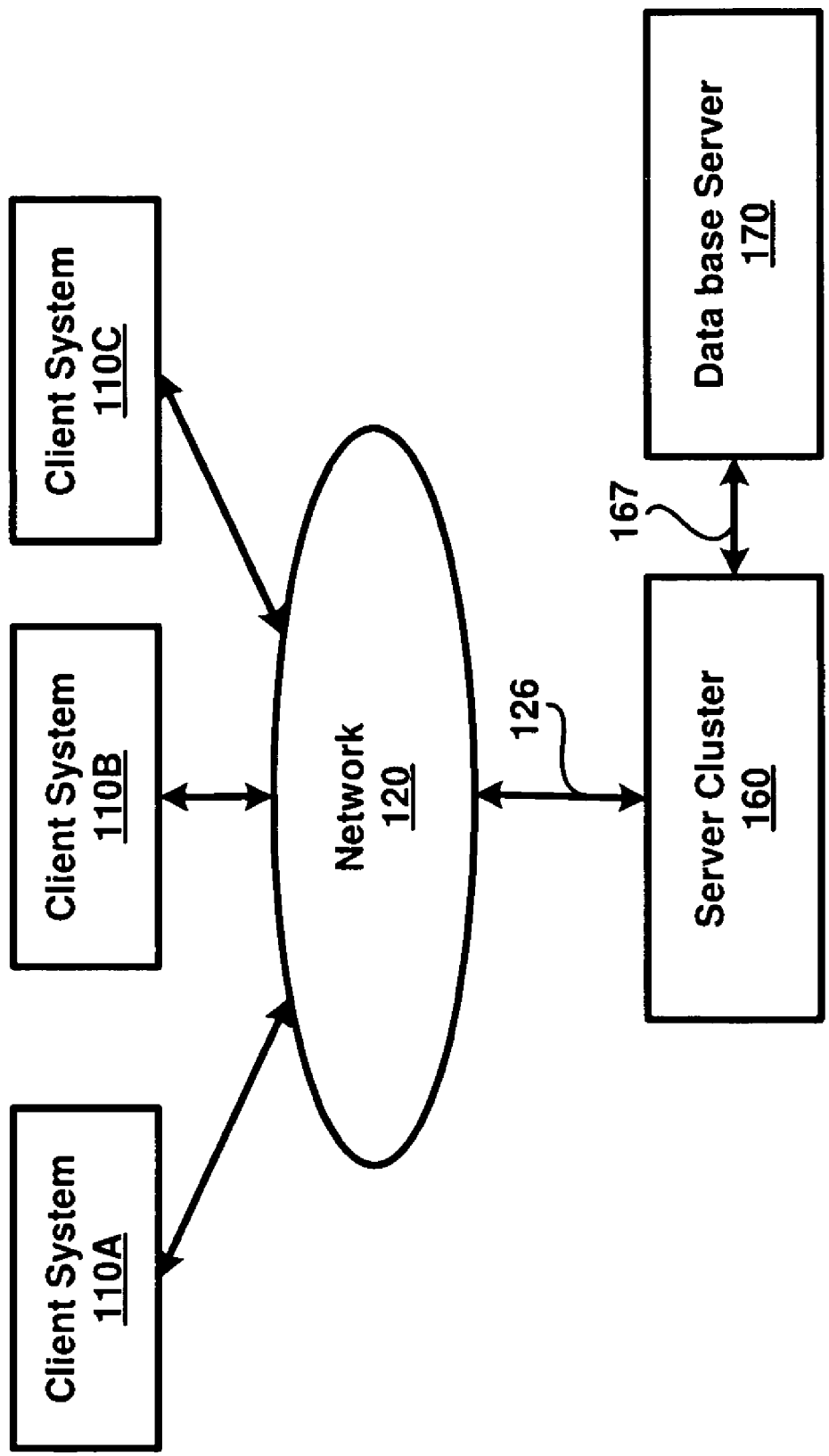
FIG. 1 is a block diagram illustrating an example computing system in which various aspects of the present invention can be implemented.

FIG. 1 is a block diagram illustrating an example computing system in which various aspects of the present invention can be implemented. The block diagram is shown containing client systems 110A-110C, network 120, server cluster 160 and database systems 170.

Merely for illustration, only representative number/type of systems are shown in the Figure. Many environments often contain many more systems, both in number and type, depending on the purpose for which the environment is designed. Each system/device of FIG. 1 is described below in further detail.

Network 120 provides connectivity between client systems 110A-110C and server cluster 160. Network 120 may be implemented using protocols such as Internet Protocol (IP) well known in the relevant arts. In general, the network provides transport of IP packets, with each packet containing a source IP address and a destination IP address. The destination IP address equals the specific IP address assigned to the specific system to which a packet is destined/targeted. The source IP address equals the IP address assigned to the specific system from which the packet originates. The packets would generally contain the requests and responses between the database systems and server cluster 160, as described below.

Database systems 170 represent one or more databases on which data is stored. Each database generally has a persistent storage and supports storage and retrieval of the data using structured queries (e.g., Structured Query Language, SQL, in the case of relational database systems). The queries are issues from the applications executing on server cluster 160, as described below. Though shown connected to the server cluster by a line 167, it should be appreciated that path 167 may correspond to an IP based Intranet (not shown), which also operates based on IP protocol, as described above.

Server cluster 160 represents one or more server systems, such as an application server, which contains software applications capable of processing requests received from client systems 110A-110C available in path 126. In an embodiment, server cluster 160 offers an application framework containing multiple applications, but with a common user interface. The users may use the common interface to interact with different applications, as desired. In addition, server cluster 160 enables users to submit multiple requests without waiting for response to at least some of the previously submitted requests, according to various aspects of the present invention, as described below with examples.

Each of client systems 110A-110C represents a system such as a personal computer, workstation, mobile station, etc., and is used by a user to submit requests to an application framework offered from server cluster 160. The requests may be generated according to a suitable interface provided by the application framework. In general, a client system submits (e.g., a transaction or retrieval of a desired content) requests and receives corresponding responses containing the results of performance of the operations (defined by the corresponding requests).

The combination of server cluster 160 and client systems 110A-110C, provided according to several aspects of the present invention, enable users to conveniently submit additional requests while server cluster 160 processes prior requests, as described below in further detail.

3. Submitting Requests

Figure 2:
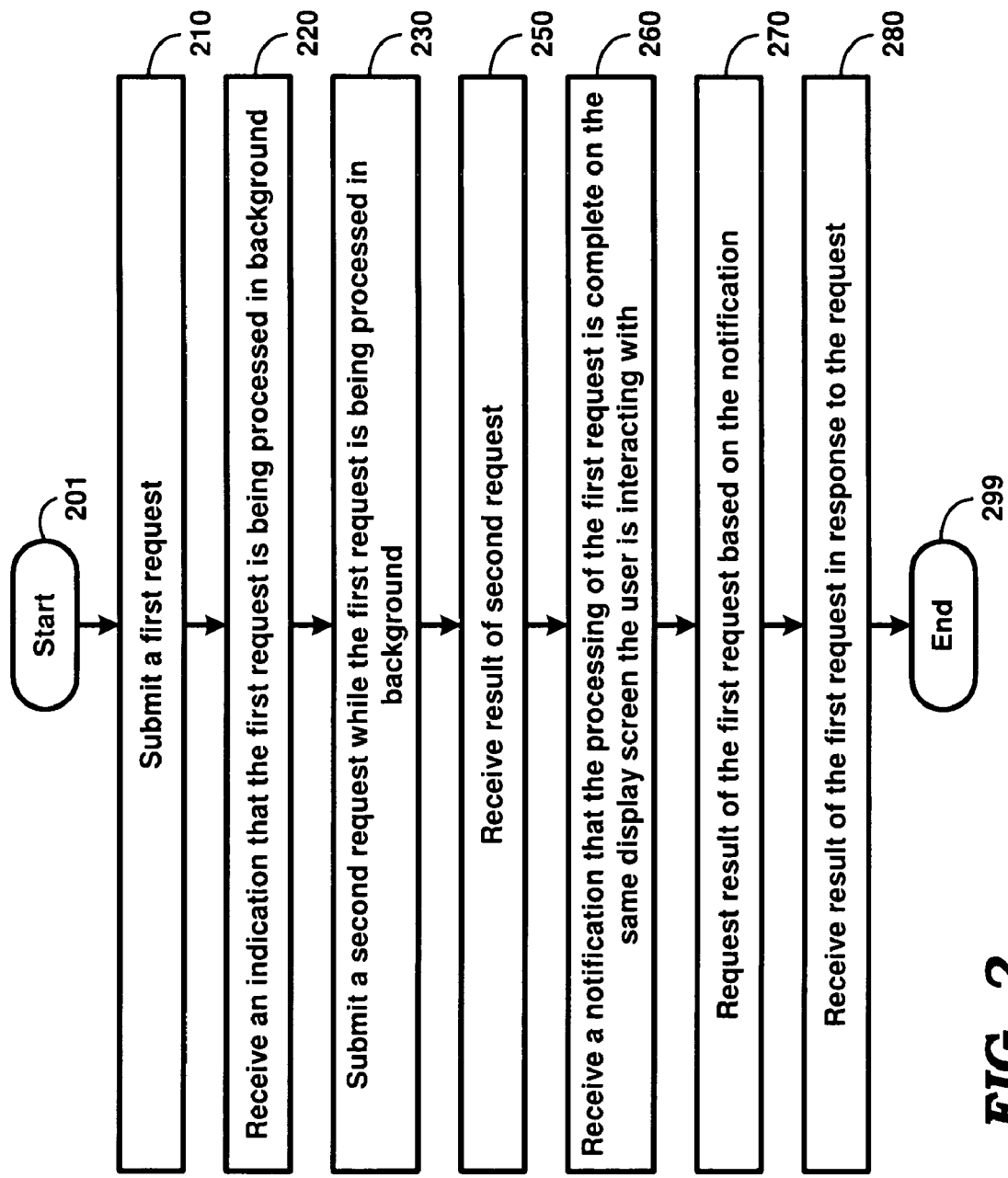
FIG. 2 is a flowchart illustrating the manner in which client systems may submit requests from a common interface provided by an application interface to a server cluster according to an aspect of the present invention

FIG. 2 is a flowchart illustrating the manner in which client systems may submit requests from a common interface provided by an application interface to a server cluster according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, client system 110A-110C may submit a first request to an application executing in server cluster 160. According to an aspect of the present invention, users submit request using a suitable interface provided by the application framework for the request. An example portion of a window (user interface) provided by the application framework for submitting a first request is described in an embodiment below with reference to FIG. 4.

In step 220, client system 110A-110C receives an indication from the application that the first request is being processed in background. Application processing the submitted request (of step 210) determines whether the request can be processed in background based on specific pre-determined conditions. Accordingly, client systems 110A-110C may receive indication on processing of the request in background. An example of such an indication received in a corresponding user interface is described in an embodiment below with reference to FIG. 5.

In step 230, client systems 110A-110C may submit a second request from the user interface provided by the application framework, for processing by the application executing on server cluster 160. An aspect of the present invention enables users to submit any additional requests while some of the previously submitted requests are being processed. Accordingly, the second request is being submitted while the processing of the first request (submitted in step 210) is being processed in the background. An example window using which a second request is submitted is described below with reference to FIG. 6 in an embodiment.

In step 250, client system 110A-110C receives result of the second request from server cluster 160 executing the application. In step 260, client system 110A-110C receives a notification that the processing of the first request is complete. According to an aspect of the present invention, the received notifications are displayed in a pre-specified portion that the user is interacting with and thus avoiding the need for the user to navigate to another application framework. An example display screen with the portion of the window containing such a notification is described in an embodiment below with reference to FIG. 8.

In step 270, client system 110A-110C requests for the result of the first request based on the notification to the application processing the request. In an embodiment, the result of the first request can be requested for from the specific portion of the window where the notification is displayed as described below with reference to FIG. 9.

In step 280, client system 110A-110C receives result of the first request in response to the request in step 270, from the application processing the request. An example user interface displaying the result of the first request is described in an embodiment below with reference to FIG. 9. The flow chart ends in step 299.

The description is continued with an illustration of the manner in which server cluster 160 process requests submitted from client systems 110A-110C according to various aspects of the present invention.

3. Processing Requests

Figure 3:
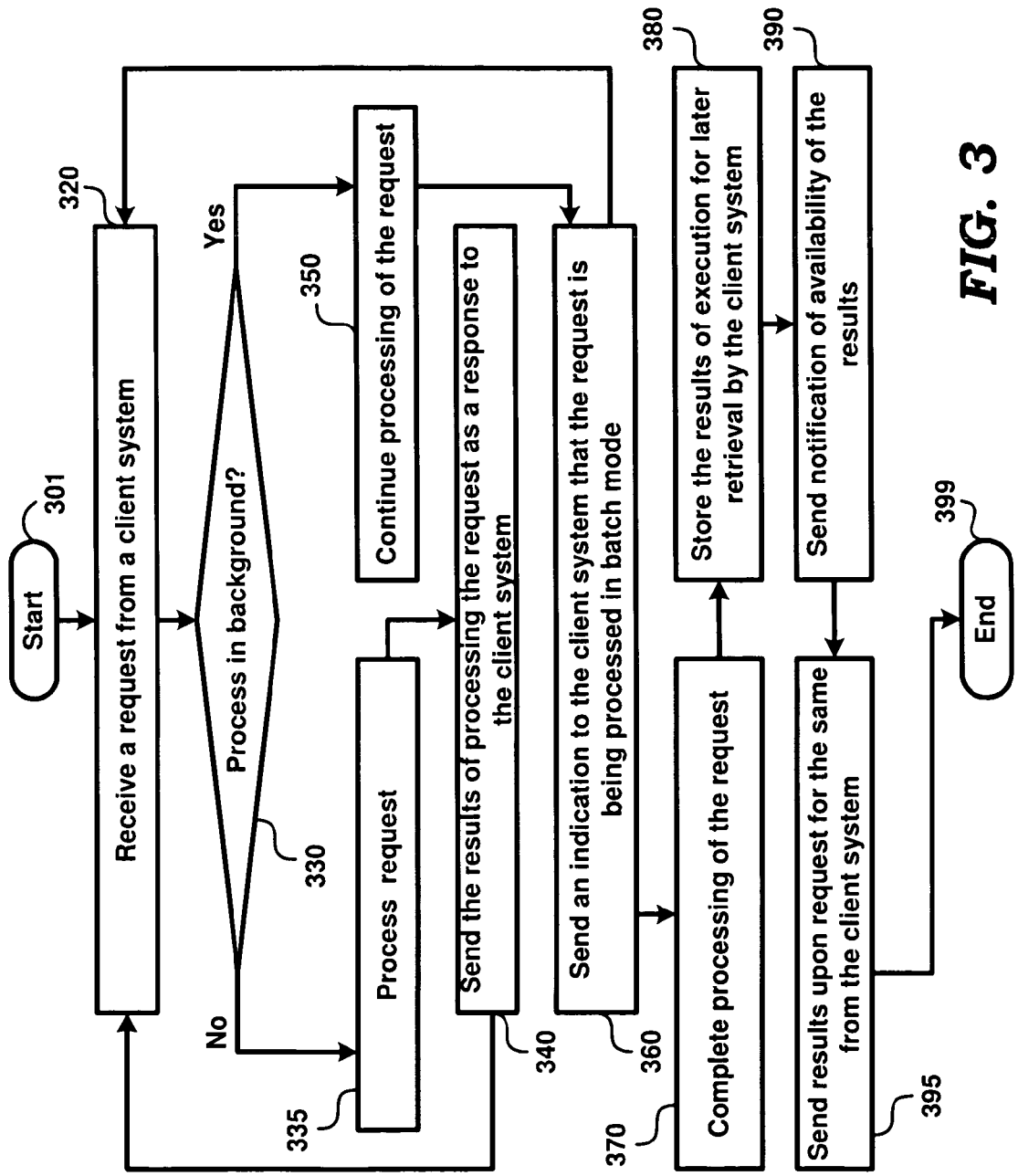
FIG. 3 is a flowchart illustrating the manner in which a server cluster processes requests received from client systems according to an aspect of the present invention.

FIG. 3 is a flowchart illustrating the manner in which server cluster 160 processes requests received from client systems 110A-110C according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 320.

In step 320, server cluster 160 receives a request from client systems 110A-110C in path 126. Client system may submit the request from the user interface provided by application framework.

In step 330, server cluster 160 determines whether to process the request in background. The determination can be based on program logic implemented by the application or external (e.g., by a common scheduler implemented external) to the application. In general, the determination can be based on various pre-determined criteria such as resource requirements (e.g., number of database records/rows to be retrieved), processing time, amount of data involved in processing of the request, etc.

Control passes to step 350, if the determination is to process the request in background or to step 335 otherwise. In step 335, server cluster 160 processes the request and in step 340, server cluster 160 sends on path 126, a response to client system 110A-110C results of execution. The result of execution of the request is displayed in the user interface from which the request has been submitted. Control passes to step 320, in which the server cluster 160 may receive another request from client system 110A-110C either from the same user interface or from any other user interface provided by the application framework.

In step 350, server cluster 160 continues processing of the request in background. If processing of the request has not started, the processing may be initiated.

In step 360, server cluster 160 sends an indication to client system 110A-110C that the request is being processed in batch mode via path 126. The indication can be in any format, consistent with a pre-specified convention.

In step 370, server cluster 160 completes processing of the request to generate the corresponding result. In step 380, server cluster 160 stores the results of execution for later retrieval by any of client systems 110A-110C. Results can be stored in a volatile storage in server cluster 160 or a persistent storage contained in database systems 170.

In step 390, server cluster 160 sends a notification of availability of the results. According to an aspect of the present invention, notifications are sent involuntarily (from the viewpoint of a user at client system) without any need for user requests for the notification.

In an embodiment described below, each notification contains a text message indicating a Universal Resource Locator (URL) at which the results of processing of the request are available (in step 380), a pre-determined portions of user interface where the notification can be displayed on client systems 110A-110C.

In step 395, server cluster 160 sends results upon request for the same from the client system (e.g., when the URL is selected by the user at the client system). Server system 160 may retrieve the stored results upon receiving the request and may send the results of the request. Control then is passed to step 399 where the flow chart ends.

It may be appreciated that the steps 350-395 relate to processing of a request in background mode and steps 335-340 relate to online processing (i.e., the user at a client system has to wait for the results) of the requests by server cluster 160. It should be further appreciated that control is shown passing to step 320 as well as step 370, indicating that the user is provided the ability to submit a next request while a previous request is being processed in background mode.

The description is continued with an illustration on how a request can be submitted from any of client systems 110A-110C in an embodiment of the present invention.

4. Example User Interface

FIGS. 4-9 depict an example user interface displayed on client systems 110A-110C, which are provided by an application framework for users to submit requests, view indications, notifications and results of execution of requests received from server cluster 160 in an embodiment of the present invention.

Figure 4:
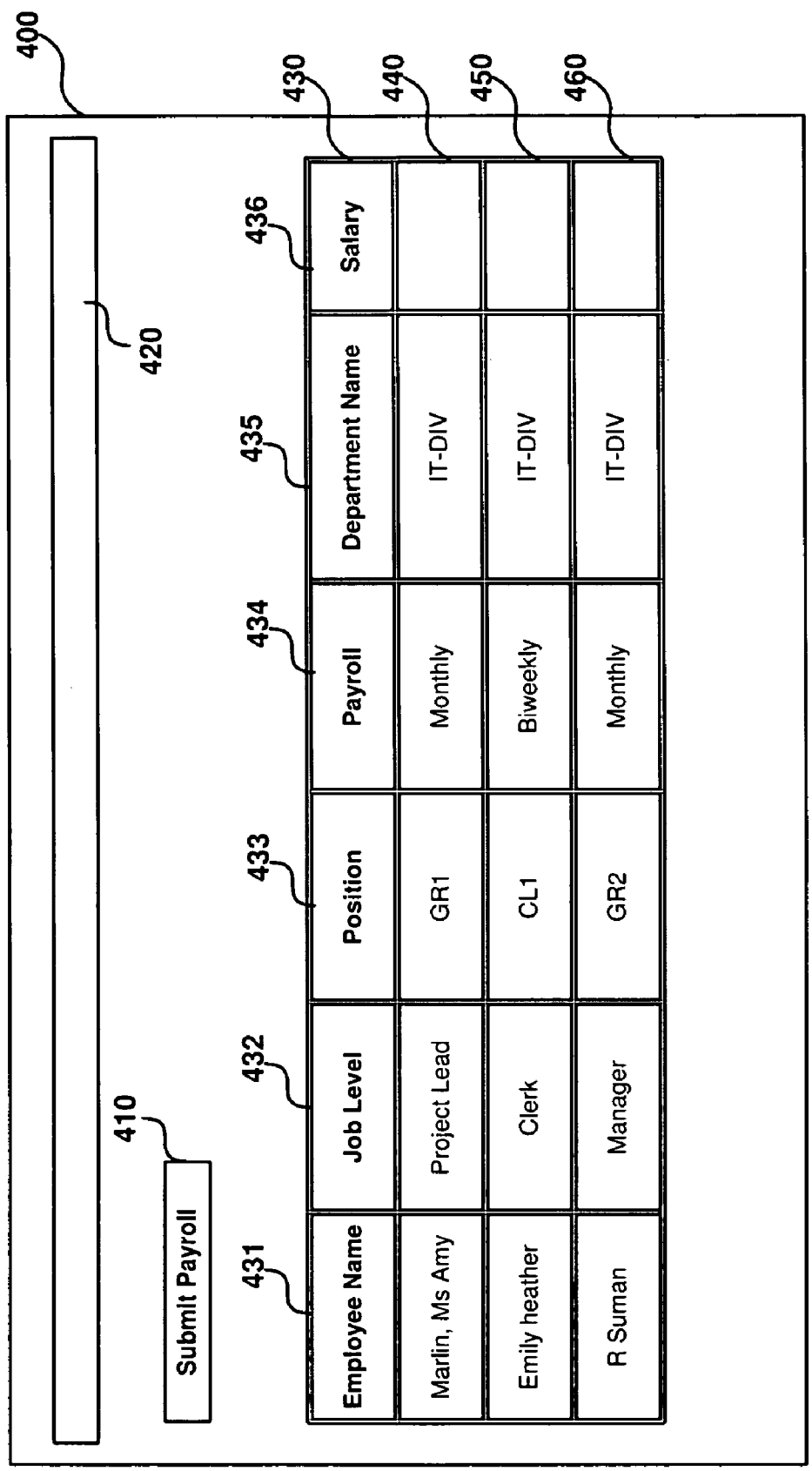
FIG. 4 represent example user interface displayed in an application framework from which user submits a request for processing in an embodiment of the present invention.

FIG. 4 is shown containing a window representing a user interface provided by a payroll application framework using which a user may submit a request for processing payroll. As is well known, a window represents a part/whole of a display screen typically provided by the underlying shared operating environment, which can usually be moved/shrinked/terminated, etc., by a user using input devices such as mouse, keyboard, touch-pad, touch-screens, etc.

A single application (e.g., in the present described embodiment, a web browser software presenting an user interface with the application framework provided according to an aspect of the present invention) is usually associated with the window, and the underlying operating system presents to the application the inputs received in the associated window, in addition to displaying the output provided by the application in the window. The window may be instantiated and displayed upon initiation of execution of the corresponding application.

It is assumed that client system 110A receives a web page by selection of appropriate menu item (not shown here, but akin to, for example, Oracle Applications Software or PeopleSoft product, both available from the intended assignee Oracle Corporation), with the web page providing fields for input of various required values. After entry of the values, the user may select (click on) the appropriate command field to submit the data to the application framework. FIG. 4 corresponds to a situation in which the web page with blank values in columns 431-435 are received (from the application framework) and the user has entered values, as described in further detail below.

FIG. 4 is shown containing command field 410, display portion 420 and rows 430, 440, 450 and 460 in the user interface. A request for processing payroll is submitted (to the application framework) when a user selects "Submit Payroll" (display portion 410). It is assumed that the user has provided the inputs shown in rows 440/450/460 and columns 431-435 (or the inputs are based on a previously submitted request), and wishes to compute the salary by selecting command field 410.

Rows 430-460 represent specific conditions to be considered while processing the request. Row 430 is shown containing the names of various columns, which appear in the result of the payroll process, viz., Employee name 431, Job Level 432, Position 433, Payroll 434, Department Name 435, and Salary 436.

Rows 440, 450, 460 contain values for the corresponding columns Employee name 431, Job Level 432, Position 433, Payroll 434 and Department Name 435. Values under column Salary 436 for corresponding rows will be shown when the request for processing of payroll is completed as described below.

When the user selects "Submit Payroll" (command field 410), client system 110A-110C sends a request to server cluster 160 via network 120 in path 126. The request may contain data representing the specific request type (here "submit payroll") and values of various input data the user has provided in user window 400. The data in the request is generally determined by the implementation of the web browser, which passes the various entered values as parameters to respective variables for further processing by the application framework.

On receiving the request, server cluster 160 determines corresponding application/instructions for processing of the request. Assuming the application framework contains multiple applications, server cluster 160 may determine the specific application to process the request. The specific application can be determined based on the content received in the request or based on state information maintained internally within server cluster 160. The web pages and corresponding logic may need to be implemented consistent with the operation.

Display portion 420 represents specific portion of the window in which notifications (of completion of execution of requests processed in background) received from server cluster 160 are displayed, in an embodiment. Notification may include a text message, which may represent the status of processing of some of the requests (previously submitted as well) that have been submitted by the user.

In an embodiment, the notifications are displayed as a single line, which scrolls gradually (e.g., in the horizontal direction in the embodiment shown in FIG. 4), and thus represents a ticker. Thus, several notifications can be displayed in display portion 420. Further, display portion 420 (location though potentially being configurable) is dedicated for displaying the notifications and thus a user's attention may be conveniently drawn upon completion of execution of requests processed in background.

Figure 5:
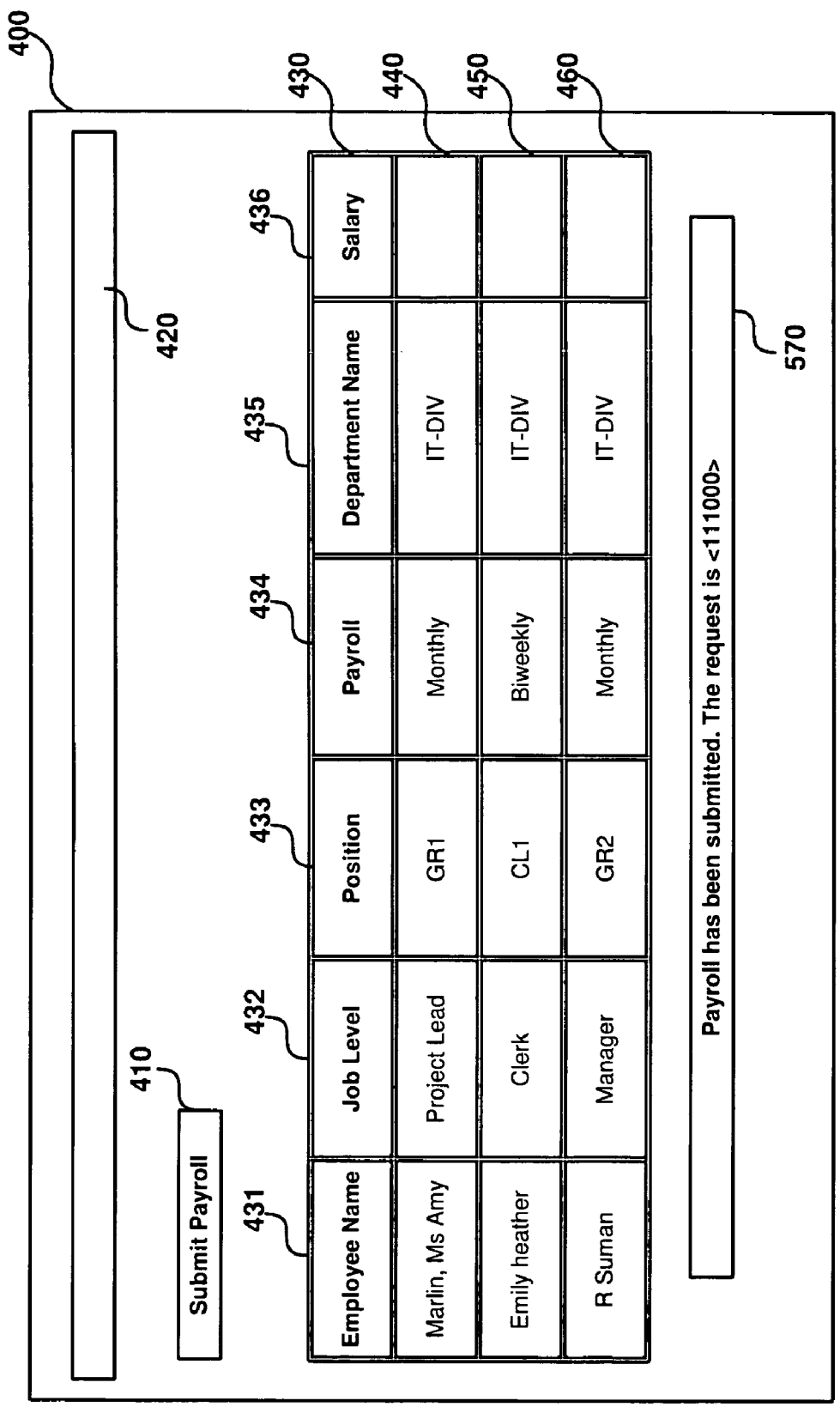
FIG. 5 indicates a user interface displayed on client system when server receiving the request determines that the request can be processed in background, in an embodiment.

The content of window 400 when the user selects 'Submit Payroll' in command field 410, is depicted in FIG. 5. FIG. 5 indicates a user interface displayed on client system 110A when server cluster determines that the request needs to be processed in background. For conciseness, only the differences from FIG. 4 are shown and described.

Display portion 570 contains a text indicator indicating that the payroll request has been submitted for processing in background. In an alternative embodiment, the text indicator may be displayed as a part of the ticker in display portion 420. As yet another alternative, the text indicator may be displayed temporarily in display portion 420, while the ticker is resumed after a short display of the text indicator.

The text indicator also contains the identifier of the request as "111000", which uniquely identifies each request processed in background. Server cluster 160 on determination that the payroll request needs to be processed in the background sends an indication as indicated in portion 570 (according to step 360) to client system 110A-110C.

As the request submitted in FIG. 4 is being processed in background, the user can submit an additional request using another user interface contained within window 400 as described below with reference to FIG. 6.

Figure 6:
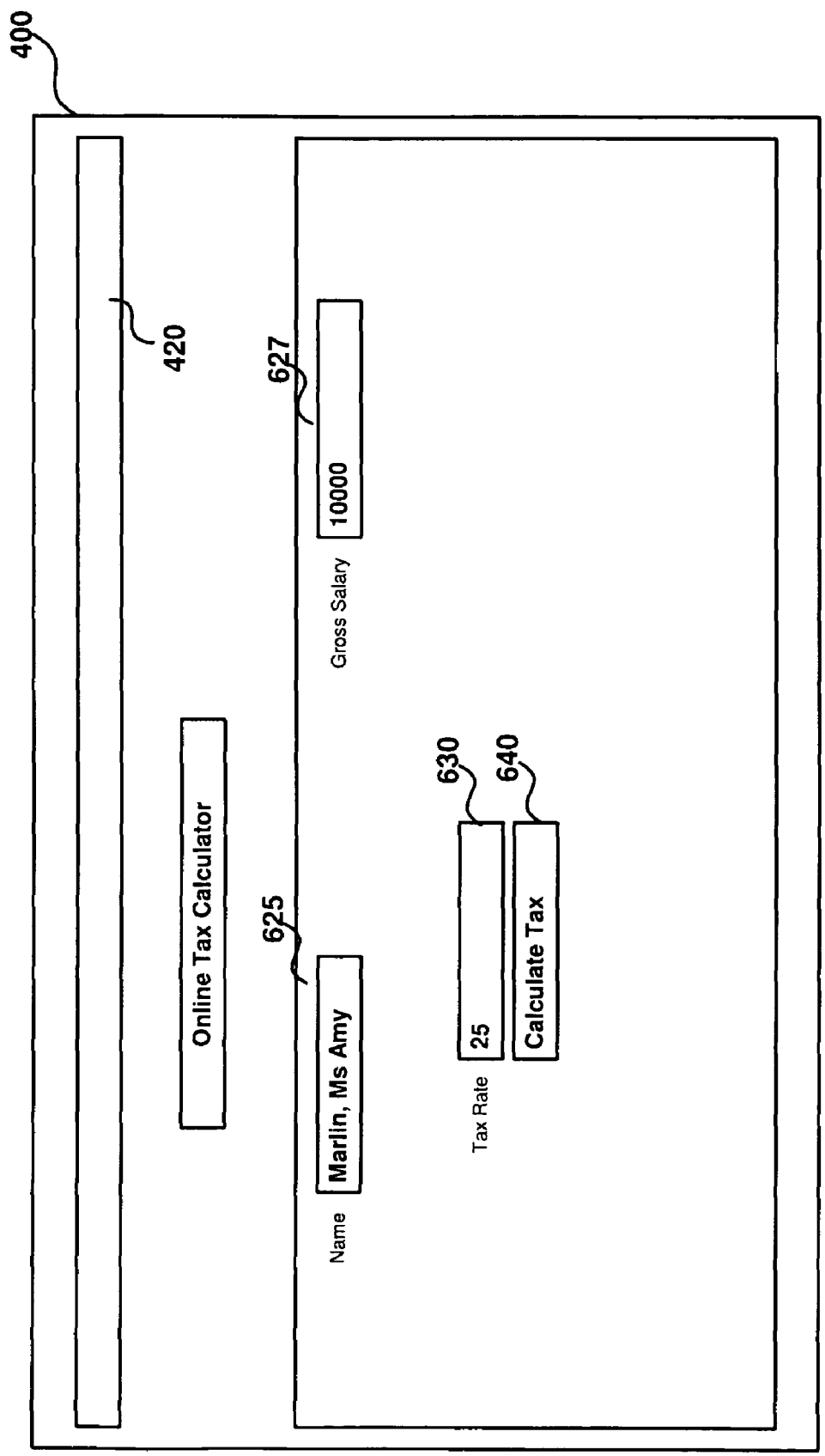
FIG. 6 indicates an example user interface from which user submits a request for processing on-line in an embodiment of the present invention.

FIG. 6 represents a user interface on client systems 110A-110C using which a user may submit another request. It is again assumed that the content of window 400 is obtained by selection of appropriate menu choices (not shown). Accordingly, FIG. 6 is shown containing portion 420, input fields 625, 627, and 630 and 640 (into which the user provides corresponding input values), and command field 640 (selection of which submits the entered data to application framework).

By providing the input values in fields 625, 627 and 630 and by selecting command field 640, a request to compute tax is submitted by client system 110A-110C to server cluster 160. Application executing in server cluster 160 may implement necessary program logic to process the request on-line and validate values provided to compute the request tax. It may be appreciated that portion 420 is displayed in predetermined portion of the window along with the new content in window 400 (corresponding to the newly selected menu choice) using which a user is submitting a request of another type. ("Calculate Tax" in command field 640).

It is assumed that user has provided the values in input fields 625, 627 and 630 respectively as "Marlin, Ms Amy" (in column 625), "10000" and "25%", and selected control field 640. It may be appreciated that processing of the request ("Calculate Tax") is being performed by server cluster 160, while any previously submitted requests are being processed in the background.

Figure 7:
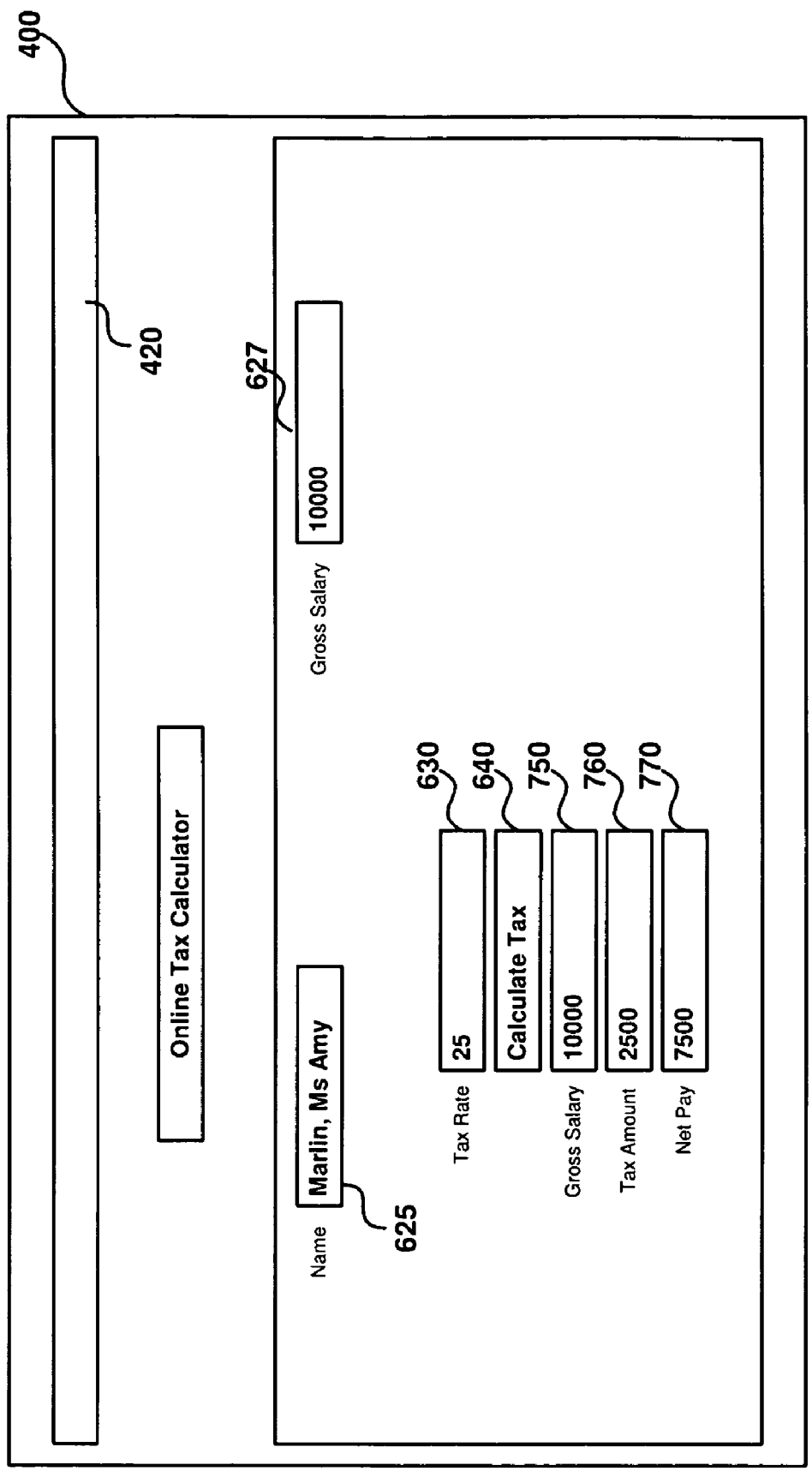
FIG. 7 represents a user interface on client system using which users can view the results of execution of a request processed on-line.

The content of window 400 when the user selects command field 640, is depicted in FIG. 7.

FIG. 7 represents a user interface on client systems 110A-110C using which users can view the results of execution of a request processed on-line. It should be appreciated that the request sent corresponding to FIG. 6 is processed online (implying that the user cannot submit additional requests until the output is displayed), and the output generated by such processing is depicted in FIG. 7.

FIG. 7 contains output fields 750, 760, 770 in window 400 in addition to contents as described with reference to FIG. 6. For conciseness, only the differences from FIG. 6 are shown and described.

Value in output field 750 corresponds to a value provided by the user as displayed in control 627. Values in fields 750 (Gross Salary), 760 (tax amount), and 770 (net pay) indicates the respective output values computed by server cluster 160 based on the values that have been provided in fields 627 and 630.

The description is continued with an illustration of how notifications are displayed in portion 420 in window 400 on client systems 110A-110C. According to an aspect of the present invention, notifications are displayed as a part of the same window in which the user is otherwise able to submit requests and view results, as described below with an example.

Figure 8:
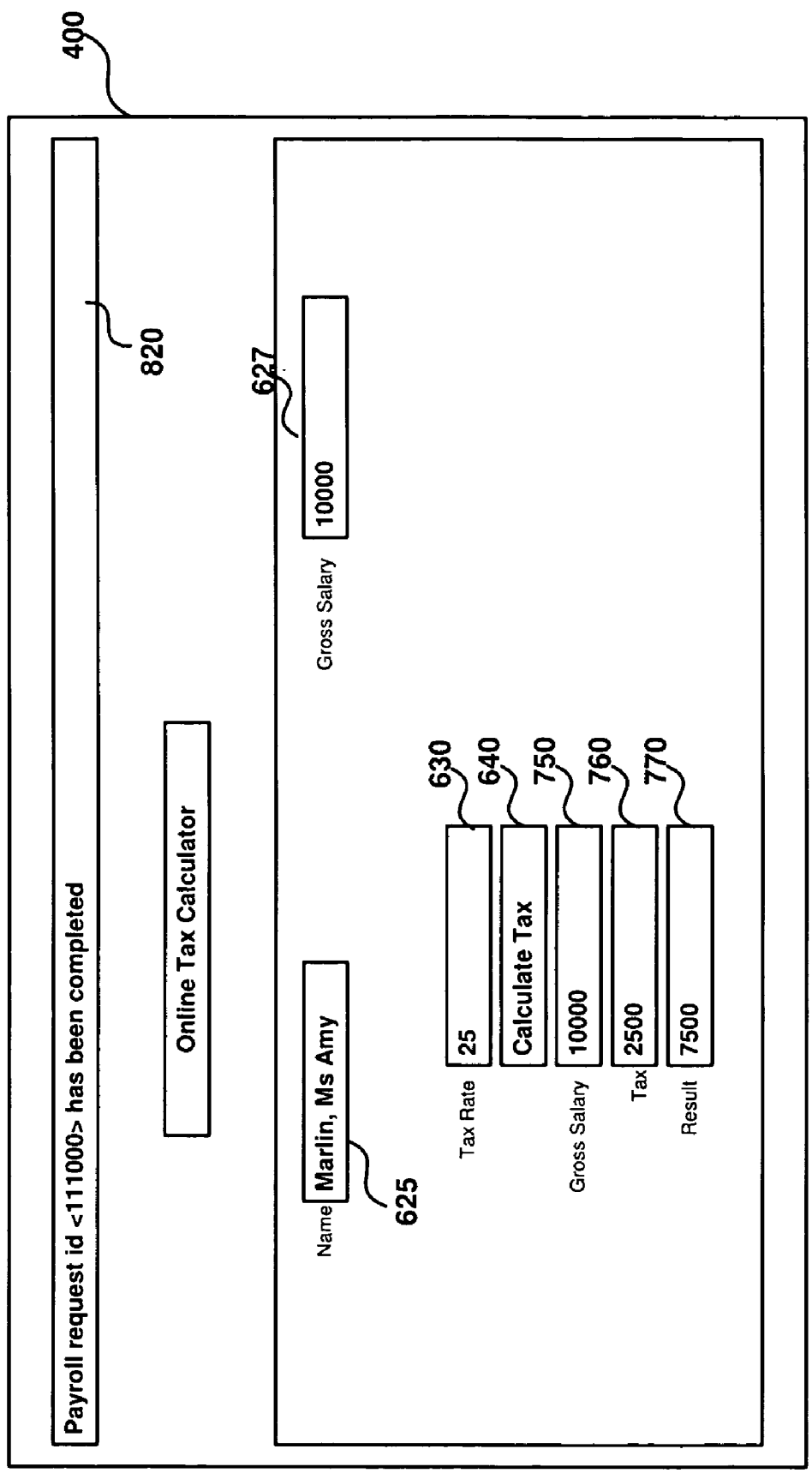
FIG. 8 contains a user interface depicting how notifications of completion of requests processed in background are displayed in an embodiment.

FIG. 8 contains a user interface depicting how notifications are displayed in an embodiment. Notifications are displayed at a pre-determined portion of window 400 of currently accessed web page within the application framework. As may be appreciated, the content of window 400 is shown displaying in portion 820 (at a pre-determined location) a text message representing a notification and also contents as described with reference to FIG. 7. For conciseness, only the differences from FIG. 7 are described.

Portion 820 (corresponds to 420, but with content changed due to the notification) corresponds to a pre-specified portion in window 400, where notifications received from server cluster 160 are displayed by client systems 110A-110C. According to another aspect of the present invention, text message in notifications indicate status of processing of any prior requests that have been processed in batch mode the common interface in window 400. Accordingly, portion 820 contains a message "Payroll request id <111000> has been completed".

It should be appreciated that portion 820 (with the updated content indicating notification) may be caused to be displayed, for example, at a next refresh of the display screen/window in response to a user action (e.g., sending a request to server cluster 160) in an otherwise natural course of interaction with the application framework. Alternatively, server cluster 160 may embed programs in the web page description (using technologies such as Java™). The embedded programs may be automatically executed within the context of the browser software. During execution, the programs may be designed to communicate with the server cluster periodically to check whether any new notifications are present, retrieve the notification and then display the retrieved notifications in portion 820.

Further, though illustrated with respect to only a single message, portion 820 can be used to display messages indicating availability of results for several requests (processed in background mode). Accordingly to an aspect, the messages are scrolled gradually within portion 820 and such scrolled display may constitute a 'ticker.' By using a ticker type of display, even a small portion can be used to display many messages. In addition, the user interface is simplified since the user merely needs to look at a pre-specified portion of the screen to know the availability of corresponding results.

According to another aspect of the present invention, users may request for the result of execution. In an embodiment described with reference to FIG. 8, users can access the result of execution of the request by selecting the hyperlinked portion ("111000") of the text message representing the notification displayed in portion 820. The description is continued with an illustration of the display screen when the results of execution are sought to be accessed (by clicking on the hyperlinked portion) in an embodiment of the present invention.

Figure 9:
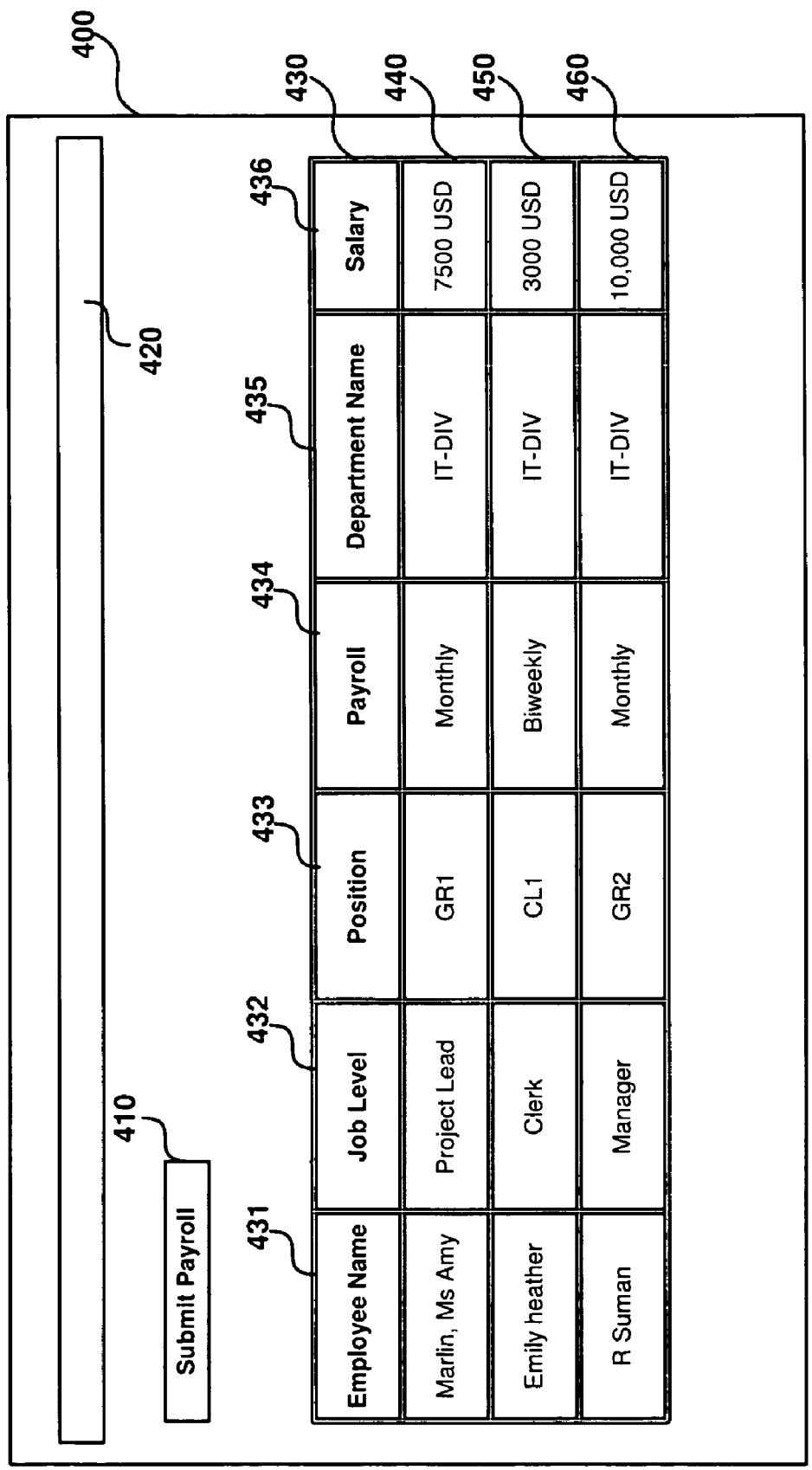
FIG. 9 contains a user interface illustrating how results of execution of a prior request submitted for processing in background are displayed in an embodiment

FIG. 9 contains a user interface illustrating how results of execution of a prior request submitted for processing in background are displayed in an embodiment (assuming the user has selected the hyperlinked portion of FIG. 8). The content of window 400 represents the results of completion of execution of the prior request "Submit Payroll". The contents of window 400 correspond to that shown with reference to FIG. 4/5 and hence for conciseness, only the differences from FIGS. 4/5 are described below.

The values in column entitled "Salary" (436) are displayed against each of the employees in rows 440, 450, 460 respectively as "7500 USD", "3000 USD" and "10,000 USD" since the processing of the request ("submit Payroll") has been completed and client systems 110A-110C has received the results of execution of the request from server cluster 160.

It may be appreciated that the users are able to view the results of execution using the common interface provided in window 400 within the payroll application framework and thus do not need to navigate to other applications (or open other windows) outside of the application framework.

In an embodiment, each of client systems 110A-110C is implemented with a web browser software to merely accept a web page description (e.g., according to HTML, augmented by Java™ compliant software as described above) from server cluster 160, and display the same in window 400. Accordingly, the 'intelligence' in constructing each of the pages consistent with the web browser software is implemented within server cluster 160. An embodiment of server cluster 160 supporting such a feature is described below in further detail.

It should be appreciated that the ticker is shown in the same window as in which the request was submitted, merely for illustration. However, in several situations, users may work with the same application framework from different windows. Usually, there is a 'present window' which is active (with which the user is currently interfacing). A window may become a present window, for example, when the user clicks on (or tabs to) a desired window in the various windows environments available in the market.

Thus, according to another aspect of the invention, in case there are multiple windows open for the user to interact with the application framework, the embedded program noted above may determine "a present window" and display the notifications in the ticker area of the present window. The ticker is displayed in the present window such that the user's attention is potentially immediately drawn. Various such extensions will be apparent to one skilled in the relevant arts by reading the present disclosure.

The features described above can be implemented using various approaches/architectures. The description is continued with respect to an example architecture of a server cluster executing multiple applications of an application framework.

5. Example Server Implementation

Figure 10:
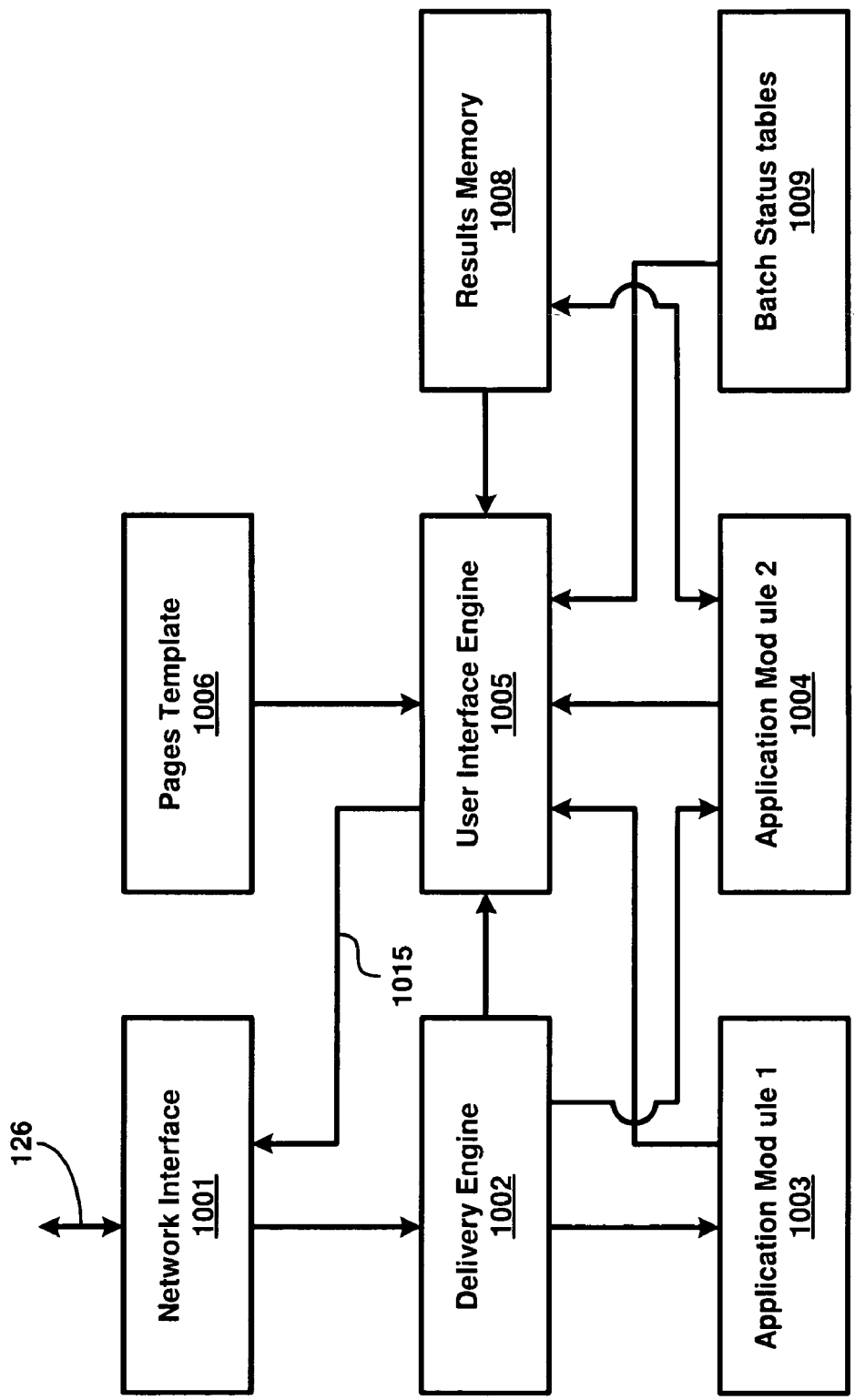
FIG. 10 is a block diagram illustrating the details of an implementation of a server cluster in an embodiment.

FIG. 10 is a block diagram illustrating the details of an implementation of server cluster 160 in an embodiment. The block diagram is shown containing blocks network interface 1001, delivery engine 1002, application module 1003, application module 1004, user interface engine 1005, pages template 1006, results memory 1008 and batch status tables 1009.

Delivery engine 1002 determines whether to direct each received request to application module 1 (1003), application module 2 (1004), or user interface engine 1005 for processing. For example, in a HTML request, the URL contains specific identifiers from which such a determination can be performed. In general, requests for results of requests processed in background are forwarded to user interface engine 1005, and the other requests are forwarded to the corresponding application module.

Pages template 1006 contains web page templates (e.g., in HTML format), some of the portions of which can be filled later by user interface engine 1005 while sending results of execution of requests and/or notifications noted above. The templates can be stored in a non-volatile memory and retrieved into a volatile memory during operation of server cluster 160.

Results Memory 1008 represents storage, where the results of a request executed in the background are stored for later retrieval. The storage may correspond to a volatile storage in server cluster 160 or persistent storage in database server 170. Each application upon completion of execution of a request in batch mode, may store the results in results memory 1008 according to a pre-determined convention such that user interface engine 1005 can send the corresponding information to the client systems.

Batch Status tables 1009 represents the status information of specific requests executing in background, and the specific location at which the results can be accessed once the execution is complete. In an embodiment, batch status tables 1009 is implemented by persistent storage in database server 170 as described below with reference to FIGS. 11A-11C.

Application module 1 (1003) and Application module 2 (1004) represent two applications (e.g, payroll and accounting respectively) executing on server cluster 160 as a part of an application framework and thus providing a common user interface. Each application may be designed to determine whether to process a received request in background mode or in online mode. The determination can be made, for example, based on the resource/time requirements to complete processing of the request.

Thus, when a request is received, the information in the request (along with any other historical/characterization information) may be quickly processed to determine the resource/time requirements, and if the time or resource requirements exceed a threshold, the application may decide to complete the processing of the request in batch mode. Otherwise, the request may be processed in online mode.

When processing the request in online mode, the application may generate output values (e.g., shown in FIG. 8), and pass the results to user interface engine 1005.

When processing the request in batch mode, application module forms an entry in batch status tables 1009 indicating the status of the request to be 'executing'. The application module may generate a unique identifier for the request and store the identifier as a key in the entry. In addition, the application module indicates (along with the unique identifier) to user interface engine 1005 that the request is being processed in batch mode.

Upon completion of execution, application module first stores the results of execution in results memory 1008 in a location according to a pre-specified convention, and updates the corresponding entry in batch status tables 1009 to indicate completion of processing of the request. The entry may also be updated with the locations at which the results are stored.

Though only two application modules are shown for illustration, the application framework can contain several more application modules, implementing respective applications.

User interface engine 1005 constructs each of the pages consistent with the common user interface and the specific environment in which the pages are displayed (For example, specific browser software). User interface engine 1005 sends each page in path 1015 for network interface 1001 to send to client systems 110A-110C in path 125. The construction of each page in a corresponding context is described below with examples.

When a user selects a menu choice, user interface engine 1005 receives a corresponding request, the corresponding template (with the data values for the input fields blank) from pages template 1006 is accessed and sent to the client system (making the request). Alternatively, the user applications may be relied upon to provide the specific web page to send.

Upon receiving the results of processing a request in online mode, user interface engine 1005 may retrieve a corresponding template from pages template 1006, incorporate the results into the template, and send the resulting web page (or page description according to HTML) to the client system. The web page may further contain embedded programs for displaying notifications, as described above.

Upon receiving an indication that a request is being processed in background, user interface engine 1005 may stream text (of 570) indicating the corresponding status. The text is received by the embedded program in the browser software, and displayed on the client system, as depicted in FIG. 5.

Upon receiving an indication that the processing of the request is complete, user interface engine 1005 may construct the hyperlinked text message (of 820) based on the location information (where the results are stored/available) in the entry corresponding to the processed request, and streams the text to client system in cooperation with the embedded software noted above.

In general, a browser software sends a request (URL and parameters) on a session connection (identified by the source/destination address/port numbers), and awaits response on the same session connection. Thus, when the request is processed in online mode, the response contains the results of processing the request. When the request is processed in background mode, an appropriate code (well known in the relevant arts) may also be sent along with indication 570, to cause the session connection to be terminated, thereby enabling the browser software to receive a subsequent request from the user.

The URL in the hyperlinked portion may specify the server cluster as the target machine to be accessed, and contain the unique identifier of the request, which facilitates the user interface engine 1005 to construct the appropriate web page (FIG. 9) with the results embedded. User interface engine 1005 may examine the location information in batch status tables 1009, and based on the examined information retrieve the results from results memory 1008. The retrieved results are embedded into a page template and the resulting web page is sent to the client system.

6. Status Information

FIGS. 11A, 11B and 11C together illustrate the various tables (and corresponding information) contained in batch status tables 1009 in an embodiment of the present invention. Each of the figures is described briefly below.

Ticker definition table of FIG. 11A depicts sample data representing definition of tickers stored in batch status tables 1009. The contents are present assuming two different users (or corresponding client systems) are setup for background mode, at least for some requests, and the users are provided the ability to specify (configure) the various characteristics (whether display/ticker 420 is to be horizontal or vertical, the name of the ticker, etc.).

Column 1110 labeled "row_identifier" specifies a unique identifier for the data contained in each row. Column 1120 labeled "ticker_id" specifies the unique identifier for the ticker. Column 1130 labeled "ticker_name" specifies the name of the ticker. Column 1150 labeled "ticker_display_mode" specifies the display mode (whether the display scrolls horizontally or vertically) for the ticker.

Each of the rows 1155, 1156 specifies the definition of a ticker display. Each request which are processed in background can indicate the manner in which the corresponding notifications are to be displayed. For example, if a request indicates the manner as "T1", the notifications displayed for the corresponding request will be according to values contained in corresponding row 1155, which indicates that notification for the request will appear as a vertically (under column ticker_display_mode 1150) scrolling text message.

Such ticker definitions can be stored by accessing a corresponding user interface (not shown) contained in the application by selecting an appropriate menu option (not shown).

Ticker enable table of FIG. 11B depicts the information that may be maintained to provide each user a choice to configure whether a ticker cane be used to display the status of a process determined to be processed in background. The information may again be configured by an administrator or by a user, as suited in the specific environments. An application may confirm that a request of a specific type is subscribed to a ticker (based on column 1166) while processing a request in background. Each of the columns and rows is described briefly below.

Column entitled "row_identifier" (1160) specifies a unique identifier for the data contained in each row (containing a unique request type). Column entitled "request_type" (1164) specifies the specific request type. Each request type may be uniquely associated with one of the application modules. Thus, each application module may be designed to execute different sets of request types and delivery engine 1002 may be designed to forward each request type to corresponding application module.

Data in column entitled "flag_ticker_enabled (1166) indicates whether the processes as defined in column 1164 of FIG. 11B are subscribing to ticker region. Subscribing to a ticker (with a value Y) implies that the output generated by requests processed in the background are made accessible via the ticker, as described above with respect to FIG. 8. On the other hand, if the entry has a value of N (not subscribing), the user is not provided the status or access to the output according to the interface of FIG. 8. This scenario is usually applicable when the output is provided in the form of files, etc., and the user is aware of the specific location where the results can be accessed.

Thus, consistent with the values in rows 1175, 1176 and 1178, when the requests processed in background are completed by the respective request types, the status information is made available in the ticker area, and the user can access the corresponding results. On the other hand, for request type INVOICING of row 1177, even when the requests are processed in the background, the status information is not made available in the ticker (and thus the user cannot access the corresponding results from the ticker region).

FIG. 11C depicts how status information of each of the requests determined to be processed in background can be maintained/monitored in an embodiment. Column entitled "row_identifier" (1160) specifies a unique identifier for the data contained in each row. Data contained in column entitled "request_id" (1162) corresponds to the identifier of the request executing in the background, the status of which is being monitored.

Column entitled "ticker_id" (1182) represents the identifier of the ticker/user to whom the information corresponding to the request of the present row needs to be delivered. Request status 1183 indicates the present status of the request in the corresponding row. The status can be one of executing (results are not yet available for display) and completed (implying the results are available at a location shown in column 1186). Once completed, the results are at a location (in results memory 1008) specified by the corresponding entry in column 1186.

Column entitled "display_msg" (1184) indicates the specific message, user interface engine (1005) can include in the text message indicating the corresponding notification. Thus, thus message ""Request id <111000>: Completed Pay roll request Sep. 31, 2005" may be generated and displayed in portion 420 of FIG. 8 from row 1196.

Column entitled "Time_entered" 1185 indicates the date/time at which the request has been submitted/processed.

Accordingly, each of the rows 1195, 1196 and 1197 specifies information on status of requests determined to be processed in background and the corresponding location of the results of execution of the request. For example, rows 1196 and 1197 indicate that the status of the requests with respective identifiers "111000" (submitted from user interface of FIG. 4) and P4 have been completed. (value under column entitled "request_status" 1183) and the corresponding text message and location of the results of execution as "completed payroll request September 7" (under column "display_msg" 1184) and "111000" (under column entitled "results-location" 1186). It may be appreciated that user interface engine 1005 can construct the text message displayed in portion 820 from the values described above.

The manner in which various blocks described above operate in the context of the tables described above, is described briefly below for ease of understanding.

7. Overall Operation

The overall operation of the server cluster 160 in an embodiment is described below in an example scenario. For illustration, it is again assumed that the specific application modules 1003/1004 are designed to determine whether to process a received request in background mode or online mode. The application modules are further assumed to be designed to check table 11B to determine whether the request type is subscribed to the ticker region so that its message corresponding to the requests processed in the background, can be displayed onto the ticker region or not.

It is further assumed that the server cluster interfaces with the client systems implementing a browser technology. As is well known, when a hyperlink is selected or data submitted by a user at the browser, a URL and related parameters are transmitted to the server cluster on a session connection (uniquely identified by a port number, TCP/UDP protocol, and an IP address at each end).

Once the applications are so deployed in an application framework, the individual users (or even session specific) are assumed to configure their specific priorities (with respect to ticker characteristics) and the corresponding information is stored in the table of FIG. 11A.

When a user system sends a request on a session connection, delivery engine examines the packet content to determine the specific application to which the request is to be delivered. The request is accordingly executed/processed by the corresponding application module.

Application module 1004 may estimate the resource requirements to process the request and determine that the request is to be processed in the background if the resource requirements exceed a threshold value.

On the other hand, if the request is to be processed in online mode, application module 1004 completes processing the request and interacts with user interface engine 1005 to send the results of execution to the client system on the same session connection (with the destination port of the packet containing the response equaling the source port number in the packet in which the request is received and the destination IP addressing equaling the address of the client system from which the request is received), as described above.

If the request is to be processed in background mode, application module 1004 adds a corresponding row in the table of FIG. 11C. For illustration, it is assumed that row 1196 is added. The row then indicates a status of Executing (though shown differently in row 1196).

In addition, application module 1004 indicates to User Interface Engine 1005 that the request is being processed in background mode. User interface engine 1005 sends a web page response (as described above), which causes the web browser in client system to disconnect the session connection, and receive a next request from the user.

Once the processing of the request is complete, application module 1004 checks the corresponding entry in the table of FIG. 11B to determine whether the results are to be made accessible available via messages in the ticker area. Assuming the request type is ticker enabled, application module 1004 stores the results in results memory 1008 and updates column 1186 row 1196 to indicate the location(s) at which the results are available. The status in the same row is updated to indicate completion.

User interface engine 1005 may be notified of completion of processing of the request. User Interface Engine 1005 may in turn construct a hyperlinked text message indicating the completion of the request, and send the message for display in portion 820 of FIG. 8 on another session connection. This session may be established with the embedded program noted above as the destination at the other end. The port number may reflect that the embedded program noted above is the destination of the message thus sent.

The URL in the hyperlinked message may point to server cluster 160 such that the User Interface Engine 1005 receives a packet (on yet another new session connection) indicating that the user has clicked on the hyperlinked portion (when such action is performed). The URL may also contain parameters identifying the specific request identifier (in column 1181).

User Interface Engine 1005 on receiving a URL/packet indicating that the user has requested results corresponding to request identifier 111000, determines Location 2 in Results memory 1008 as the place at which the results are available. The results are retrieved and embedded into a page template (from pages template 1006), and sent to the client system (on the another new connection noted above), as shown in FIG. 9.

It should be appreciated that the features described above can be implemented in various embodiments as a desired combination of one or more of hardware, software and firmware. The description is continued with respect to an embodiment in which various features are operative when software instructions are executed.

8. Digital Processing System

Figure 12:
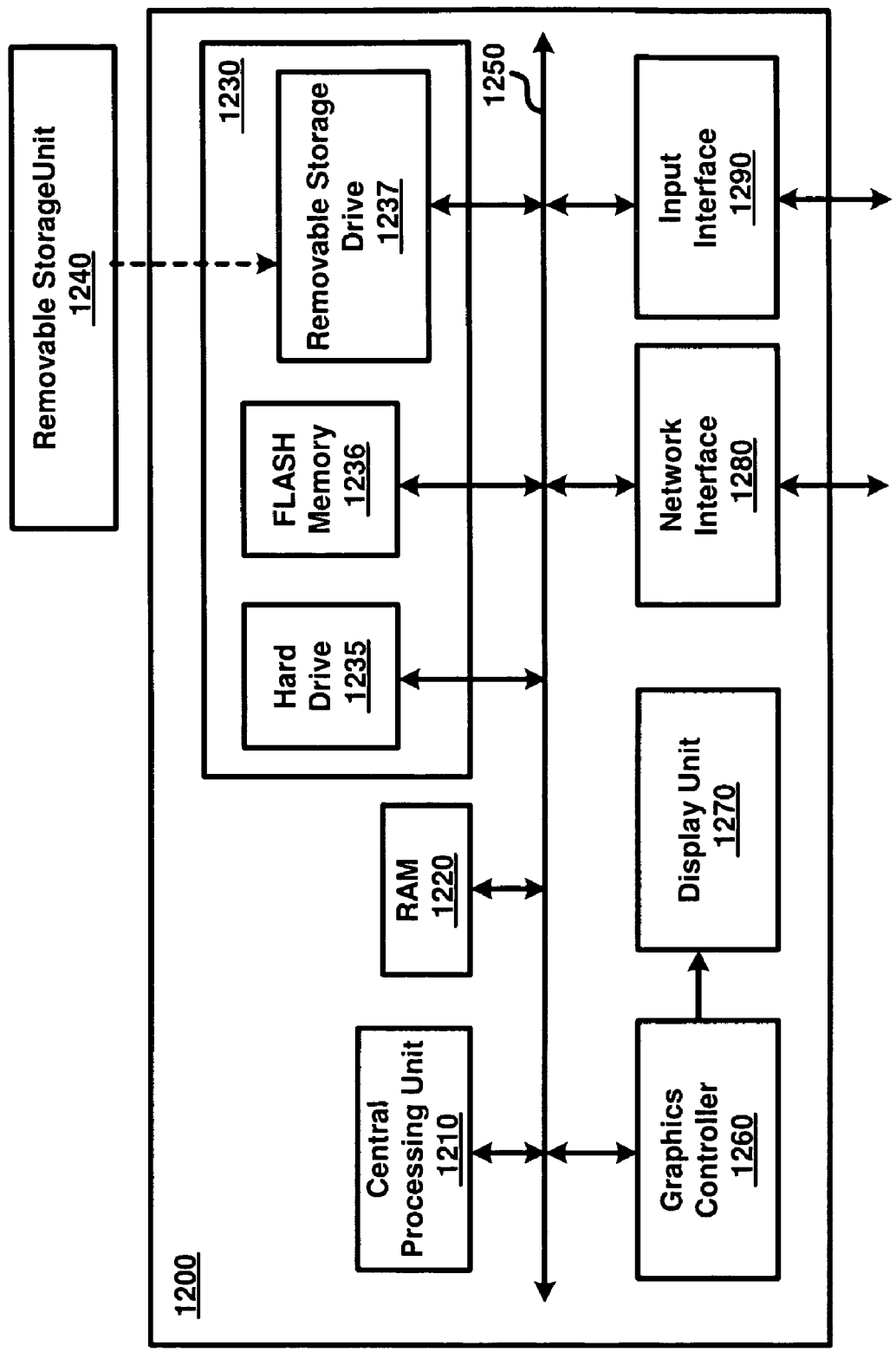
FIG. 12 is a block diagram illustrating the details of a digital processing system in which various aspects of the present invention are operative by execution of appropriate software instructions in on embodiment.

FIG. 12 is a block diagram illustrating the details of digital processing system 1200 in which various aspects of the present invention are operative by execution of appropriate software instructions. Digital processing system 1200 may correspond to any one of server cluster 160 and client systems 110A/110B/110C.

Digital processing system 1200 may contain one or more processors (such as a central processing unit (CPU) 1210), random access memory (RAM) 1220, secondary memory 1230, graphics controller 1260, display unit 1270, network interface 1280, and input interface 1290. All the components except display unit 1270 may communicate with each other over communication path 1250, which may contain several buses as is well known in the relevant arts. The components of FIG. 12 are described below in further detail.

CPU 1210 may execute instructions stored in RAM 1220 to provide several features of the present invention. CPU 1210 may contain multiple processing units, with each processing unit potentially being designed for a specific task. Alternatively, CPU 1210 may contain only a single general purpose processing unit. RAM 1220 may receive instructions from secondary memory 1230 using communication path 1250.

Graphics controller 1260 generates display signals (e.g., in RGB format) to display unit 1270 based on data/instructions received from CPU 1210. Display unit 1270 contains a display screen to display the images defined by the display signals. The display screen may display the various windows (forming the basis for corresponding user interfaces) described above with respect to FIGS. 4-9.

Input interface 1290 may correspond to a keyboard and a pointing device (e.g., touch-pad, mouse), which enable the various inputs (e.g., those shown in FIGS. 4 and 6 above) and configuration values (e.g., those in FIGS. 11A and 11B) to be provided. Network interface 1280 provides connectivity to a network (e.g., using Internet Protocol), and may be used to communicate with other connected systems (the remaining ones of 110A/B/C and server cluster 160) of FIG. 1.

Secondary memory 1230 may contain hard drive 1235, flash memory 1236, and removable storage drive 1237. Secondary memory 1230 may store the data (e.g., portions of data depicted in tables of FIGS. 11A-11C) and software instructions (e.g., portions of code representing application modules), which enable digital processing system 1200 to provide several features in accordance with the present invention.

Some or all of the data and instructions may be provided on removable storage unit 1240, and the data and instructions may be read and provided by removable storage drive 1237 to CPU 1210. Floppy drive, magnetic tape drive, CD-ROM drive, DVD Drive, Flash memory, removable memory chip (PCMCIA Card, EPROM) are examples of such removable storage drive 1237.

Removable storage unit 1240 may be implemented using medium and storage format compatible with removable storage drive 1237 such that removable storage drive 1237 can read the data and instructions. Thus, removable storage unit 1240 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 1240 or hard disk installed in hard drive 1235. These computer program products are means for providing software to digital processing system 1200. CPU 1210 may retrieve the software instructions, and execute the instructions to provide various features of the present invention described above.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A computing system comprising:

a client system to send a plurality of requests including a first request and a second request in response to corresponding user actions in a user interface provided for a user from a first window, said from user interface being provided for said user to interact with an application framework; and a server cluster containing one or more server systems, said server cluster to execute said application framework which receives said first request and said second request, said server cluster to determine resource requirements for processing each request received from said client system, and to process requests requiring more resources in a background mode compared to requests requiring lesser resources in online mode, said service cluster determining to process said first request and said second request in online mode and in said background mode respectively based on determined corresponding resource requirements, said server cluster to process said first request in an online mode to generate a first result and sending said first result to said client system for display on said first window, wherein said server cluster sends a message to said client system indicating that said second request is being processed in said background mode upon the corresponding determination, said server cluster to process said second request in a background mode to generate a second result, and to send a notification indicating availability of said second result of said second request for display in a second window also providing said user interface for said user to interact with said application framework, wherein said client system displays said notification in a portion of said second window, wherein said server cluster receives a follow-up request after sending said notification, wherein said server cluster sends said second result in response to said follow-up request, wherein said message is sent prior to sending said notification.

2. The computing system of claim 1, wherein said server cluster generates a plurality of notifications corresponding to requests processed in said background mode and sends said plurality of notifications to said client system, said client system displays said plurality of notifications in the form of a ticker in said portion of said second window.

3. The computing system of claim 2, wherein said server cluster sends said notification in the form of a hyperlinked text without including said second result, which when selected by a user in said portion at said client system causes a data to be sent to said server cluster, said data containing an identifier of said second result and requesting a response web page, wherein said server cluster identifies said second result based on said identifier received from said client system, said server cluster incorporating said results into a web page and sending the incorporated web page as said response web page.

4. The computing system of claim 3, wherein said server cluster comprises:

a plurality of applications designed to execute a corresponding type of requests.

5. The computing system of claim 1, wherein said user submits a third request while said second request is being processed in said background mode, wherein said application framework in said server cluster processes said second request in parallel to said third request.

6. The computing system of claim 1, wherein said server cluster comprises:

a memory to store a ticker enabled table indicating whether each of a plurality of request types are ticker enabled or not; and a processor to determine a type of said second request and sends said notification to said client system only if said type is ticker enabled according to said ticker enabled table.

7. A method of interfacing with an application framework implemented on a server cluster, said method being performed in a client system, said method comprising:

submitting a first request from a window provided in said client system;

receiving an indication that said first request is being processed in background;

submitting a second request to said server cluster in said window without waiting for result of said first request;

receiving a second result of execution of said second request as an online response;

receiving a notification which indicates that the processing of said first request is complete, without containing a result of execution of said first request, said notification being in the form of a hyperlinked text without including said result of execution of said first request, said hyperlinked text being designed to cause said client system to send a data upon selection of said hyperlinked text, said data containing an identifier of result of execution of said first request;

upon selection of said hyperlinked text, sending said data to said server cluster to request the result of execution of said first request after receiving said notification; and receiving a first result of execution of said first request in said window in response to said selection.

8. The method of claim 7, wherein said notification is also displayed in said first window.

9. The method of claim 7, wherein said notification is displayed in another window presently used by said user to interact with said application framework.

10. The method of claim 7, wherein said user submits said first request and said second request on a first portion of a display screen, wherein said display screen also contains a second portion to display said notification.

11. The method of claim 7, wherein said notification is received involuntarily and displayed in said second portion after submitting said first request.

12. A non-transitory machine readable storage medium storing one or more sequences of instructions for causing a server system to process requests, wherein execution of said one or more sequences of instructions by one or more processors contained in said system causes said server system to perform the actions of:

receiving a first request on a first session connection and a second request on a second session connection from a client system;

providing said first request and said second request to an application executing in said server system;

determining to process said first request in a online mode and said second request in a background mode, wherein processing of said first request and said second request in said application respectively generates a first result and a second result;

sending a first result as response to said first request on said first session connection;

causing termination of said second session connection without sending said second result in response to said determining that said second request is to be processed in said background mode; and sending a notification indicating availability of said second result on a third session connection established with said client system, said notification being sent in response to said determining that said second request is to be processed in said background mode, wherein said notification is in the form of a hyperlinked text, which when selected by a user in said client system causes a data to be received in said server cluster, said data containing an identifier of said second result and requesting a response web page:

receiving a request for said second result based on said data included in said hyperlinked text, said request being received after sending said notification;

incorporating said results into a web page in response to receiving said request; and sending the incorporated web page as a response web page.

13. The non-transitory machine readable storage medium of claim 12, wherein said determining comprises:

checking a first resource requirement to process said first request and a second resource requirement to process said second request;

comparing each of said first resource requirement and said second resource requirement with a threshold requirement, wherein said first resource requirement is less than said threshold requirement and said second resource requirement is more than said threshold requirement such that said first request is processed in said online mode and said second request is processed in said background mode.

14. The non-transitory machine readable storage medium of claim 12, wherein said checking and said comparing are performed by instructions constituting said application.

15. The non-transitory machine readable storage medium of claim 12, further comprising:

receiving a followup request after sending said notification; and sending said second result in response to receiving said followup request.

16. The non-transitory machine readable storage medium of claim 15, wherein said application stores said second result in a location, wherein said identifier identifies said location.

17. A computing system comprising:

a client system to send a plurality of requests including a first request and a second request in response to corresponding user actions in a user interface provided for a user from a first window, said user interface being provided for said user to interact with an application framework; and a server cluster containing one or more server systems, said server cluster to execute said application framework which receives said first request and said second request, said server cluster to determine resource requirements for processing each request received from said client system, and to process requests requiring more resources in a background mode compared to requests requiring lesser resources in online mode, said service cluster determining to process said first request and said second request in online mode and in said background mode respectively based on determined corresponding resource requirements, said server cluster to process said first request in an online mode to generate a first result and sending said first result to said client system for display on said first window, said server cluster to process said second request in a background mode to generate a second result, and to send a notification indicating availability of said second result of said second request for display in a second window also providing said user interface for said user to interact with said application framework, wherein said server cluster sends said notification in the form of a hyperlinked text without including said second result, which when selected by a user in said portion at said client system causes a data to be sent to said server cluster, said data containing an identifier of said second result and requesting a response web page, wherein said client system displays said notification in a portion of said second window, wherein said server cluster receives a follow-up request after sending said notification upon selection of said hyperlinked text in said portion, wherein said server cluster sends said second result in response to said follow-up request, wherein said server cluster identifies said second result based on said identifier received from said client system, said server cluster incorporating said results into a web page and sending the incorporated web page as said response web page.

18. A server cluster to process requests, said server system comprising:

one or more memory units to store instructions;

one or more processors to retrieve and execute said instructions, wherein execution of said instructions causes said server cluster to perform the actions of:

receive a first request on a first session connection and a second request on a second session connection from a client system;

provide said first request and said second request to an application executing in said server system;

determine to process said first request in a online mode and said second request in a background mode, wherein processing of said first request and said second request in said application respectively generates a first result and a second result;

send a first result as response to said first request on said first session connection;

cause termination of said second session connection without sending said second result in response to said determining that said second request is to be processed in said background mode; and send a notification indicating availability of said second result on a third session connection established with said client system, said notification being sent in response to said determining that said second request is to be processed in said background mode, wherein said notification is in the form of a hyperlinked text, which when selected by a user in said client system causes a data to be received in said server cluster, said data containing an identifier of said second result and requesting a response web page:

receive a request for said second result based on said data included in said hyperlinked text, said request being received after sending said notification;

incorporate said results into a web page in response to receiving said request; and send the incorporated web page as a response web page.

19. A server cluster to process requests, said server system comprising:

one or more memory units to store instructions;

one or more processors to retrieve and execute said instructions, wherein execution of said instructions causes said server cluster to perform the actions of:

receive a plurality of requests from a client system including a first request and a second request in response to corresponding user actions at said client system; and determine resource requirements for processing each request received from said client system, and to process requests requiring more resources in a background mode compared to requests requiring lesser resources in online mode, said service cluster determining to process said first request and said second request in online mode and in said background mode respectively based on determined corresponding resource requirements;

process said first request in an online mode to generate a first result and sending said first result to said client system for display on a first window from which said first request was received, said first window providing a user interface for a user on said client system to interact with an application framework on said server;

process said second request in a background mode to generate a second result;

send a notification indicating availability of said second result of said second request for display in a second window also providing said user interface for said user to interact with said application framework, said notification being in the form of a hyperlinked text without including said second result, which when selected by a user in said portion at said client system causes a data to be sent to said server cluster, said data containing an identifier of said second result and requesting a response web page, wherein said client system displays said notification in a portion of said second window;

receive a follow-up request after sending said notification upon selection of said hyperlinked text;

identify said second result based on said identifier received from said client system;

incorporating said identified second result into a web page; and send the incorporated web page as a response to said follow-up request.

* * * * *

UNITED STATES PATENT AND TRADEMARK OFFICE
CERTIFICATE OF CORRECTION

| | | |
|---|---|---|
| PATENT NO. | : 7,885,994 B2 | |
| APPLICATION NO. | : 12/035451 | |
| DATED | : February 8, 2011 | |
| INVENTOR(S) | : Lavanya et al. | |

It is certified that error appears in the above-identified patent and that said Letters Patent is hereby corrected as shown below:

On the title page, in column 1, in field 75, under "Inventors", line 4, delete " Nagour" and insert -- Nagaur --, therefor.

In column 1, line 20, after "herewith" insert -- . --.

In column 1, line 34, delete "availability.," and insert -- availability, --, therefor.

In column 2, line 12, after "invention" insert -- . --.

In column 2, line 33, after "embodiment" insert -- . --.

In column 13, line 22, delete "cane" and insert -- can --, therefor.

In column 17, line 19, in Claim 1, after "said" delete "from".

Signed and Sealed this
Twentieth Day of September, 2011

David J. Kappos
*Director of the United States Patent and Trademark Office*